United States Patent
Shiang et al.

(10) Patent No.: US 11,644,374 B2
(45) Date of Patent: May 9, 2023

(54) LEFT AND RIGHT FEET PEDALING ANALYSIS SYSTEM

(71) Applicant: NATIONAL TAIWAN NORMAL UNIVERSITY, Taipei (TW)

(72) Inventors: Tzyy-Yuang Shiang, Taipei (TW); Yin-Shin Lee, Taipei (TW); Ming-Hsiu Lee, Taipei (TW); Yu-Cheng Chiu, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 396 days.

(21) Appl. No.: 16/737,284

(22) Filed: Jan. 8, 2020

(65) Prior Publication Data
US 2020/0225105 A1 Jul. 16, 2020

(30) Foreign Application Priority Data
Jan. 11, 2019 (TW) ................................ 108101225

(51) Int. Cl.
| | | |
|---|---|---|
| *G01L 5/22* | (2006.01) | |
| *G01P 15/18* | (2013.01) | |
| *B62J 50/22* | (2020.01) | |
| *B62J 45/413* | (2020.01) | |
| *B62J 45/414* | (2020.01) | |
| *B62J 45/421* | (2020.01) | |

(52) U.S. Cl.
CPC ............. *G01L 5/225* (2013.01); *B62J 45/413* (2020.02); *B62J 45/414* (2020.02); *B62J 45/421* (2020.02); *B62J 50/22* (2020.02); *G01P 15/18* (2013.01)

(58) Field of Classification Search
CPC . G01L 5/225; G01P 15/18; G01P 3/48; G01P 3/22; B62J 45/413; B62J 45/414; B62J 45/421; B62J 50/22
See application file for complete search history.

(56) References Cited

U.S. PATENT DOCUMENTS

| | | | |
|---|---|---|---|
| 4,526,036 A * | 7/1985 | Morrison | G01P 15/121 73/514.12 |
| 2011/0087446 A1* | 4/2011 | Redmond | G01P 3/22 73/379.01 |
| 2013/0197744 A1* | 8/2013 | Tuulari | H04L 67/125 701/34.4 |
| 2013/0205896 A1* | 8/2013 | Baechler | G01P 1/023 73/493 |

(Continued)

*Primary Examiner* — Helen C Kwok
(74) *Attorney, Agent, or Firm* — WPAT, P.C

(57) ABSTRACT

A left and right feet pedaling analysis system is disclosed, comprising a pedaling sensing device and an electronic carrier, wherein the pedaling sensing device includes one or more transmission units and one or more accelerometers which are applied to detect the acceleration change data during pedaling, and the pedaling sensing device or/and the electronic carrier can analyze the signals coming from the accelerometer during riding the bicycle in order to acquire the pedaling rotation number, the ratio of the left and right foot forces as well as the installation direction thereby understanding the pedaling distribution ratio of the left and right foot when riding; as such, it can help improve the pedaling skills and adjust the pedaling force mode so as to reduce the risk of injury caused by excessively unbalanced pedaling asymmetry.

4 Claims, 11 Drawing Sheets

(56) References Cited

U.S. PATENT DOCUMENTS

| | | | | |
|---|---|---|---|---|
| 2013/0210583 A1* | 8/2013 | Kametani | ................ | B62M 3/00 |
| | | | | 482/8 |
| 2015/0345925 A1* | 12/2015 | Smit | ........................ | G01L 5/00 |
| | | | | 702/150 |
| 2015/0345952 A1* | 12/2015 | Chang | .................... | G01C 21/12 |
| | | | | 701/541 |
| 2016/0089072 A1* | 3/2016 | Tetsuka | .............. | A63B 22/0605 |
| | | | | 73/862.321 |
| 2017/0050080 A1* | 2/2017 | Mizuochi | ................ | G01S 19/51 |
| 2017/0115319 A1* | 4/2017 | Ookubo | ................... | B62J 45/20 |
| 2017/0285065 A1* | 10/2017 | Hawker | ................ | G01P 15/18 |
| 2017/0334513 A1* | 11/2017 | Brulais | ................... | G01L 3/245 |
| 2019/0001184 A1* | 1/2019 | Schindler-Ivens | ......................... | |
| | | | | A63B 22/0025 |
| 2019/0358483 A1* | 11/2019 | Fuchs | ................ | A63B 24/0087 |

* cited by examiner

LEFT AND RIGHT FEET PEDALING ANALYSIS SYSTEM

BACKGROUND OF THE INVENTION

1. Field of the Invention

The present invention generally relates to a left and right feet pedaling analysis system; in particular, it relates to a left and right feet pedaling analysis system which is installable onto the crack of any type of bicycle, capable of analyzing the pedaling rotation number, the ratio of left and right feet forces and the installation direction, as well as displaying such information on an electronic carrier.

2. Description of Related Art

Cycling is one of the popular sports nowadays, and many people choose cycling as their leisure activity on holiday; in addition, cycling imposes comparatively less burden on human's lower limbs, which is very suitable for various ethnic groups to engage in this type of sport. Recently, with the popularity of cycling, various bicycle competitions are frequently held, and bicycles are also one of the sports competitions in the world, e.g., three globally renowned bicycle races (Tour de France, Tour d'Italie, and Tour d'Espagne) and Olympic bicycle events; therefore, it is comprehensively appreciated that the use of bicycles has changed from being a means of transport in the past to a choice of recreational sports, and even one of competitive sports.

As a result, from the point of view of cycling pursuing better performance and lower injury risks, suppose the riders can be informed of their performance while riding, or timely notifying them potential injury possibilities, it may be achievable to improve the rider's willingness to engage in this sport, thereby allowing them to enhance their cardio-pulmonary endurance and muscle strength through gradual riding training courses within the range of their abilities, so as to improve physical performance without getting hurt. Consequently, methods or tools for determining such performances or injuries have always been a major topic of common concerns among numerous cyclists, athletes, coaches and researchers.

It should be understood that the driving force of bicycles comes from the contraction of the muscles of the rider's legs and the cycling action of the foot pedals, which is then converted into crank rotations and subsequently transmitted to the rear wheel of the bicycle to move the bicycle forwards; therefore, the number of revolutions is closely related to the efficiency of the bicycle's forward movement, the strategies on adjustments with respect to different gradients or riding speeds during competitions etc.

When cycling enthusiasts and athletes ride and exercise to a certain specific pedaling rotation number, it is quite common that they may start to complain that when this specific pedaling rotation number, or otherwise a faster value, has been reached, forces coming from their left and right feet may be unevenly applied, indicating that one foot always adversely exerts more force during pedaling than the other one. Hence, after riding, one side of the body may be sorer and more fatigued than the other side, and under this kind of riding condition for a longer time, it may affect cycling performance or seriously lead to physical injuries which will require rehabilitation treatments and rests etc.

Therefore, the current pedaling rotation number and the pedaling force distribution of the left and right feet during riding actions are information that bike enthusiasts, athletes and coaches truly intend to pay close attention to, and through understanding the distribution ratio of the left and right feet pedaling when riding, it is helpful to improve the pedaling technique and adjust the pedaling force application mode thereby reducing the risks of injury caused by excessively unbalanced pedaling asymmetry.

Unfortunately, at present there are no available devices or products on the market that can simultaneously calculate the pedaling frequency and determine the force ratio of the left and right feet, but it is often necessary to install two or more products in order to obtain such information. In addition, most bicycle products capable of determining the force ratio of the left and right feet are typically designed based on sensors using strain gauges. It should be noticed that, this sort of products can generate current output through the deformation amount of the strain gauge, and then convert it into the corresponding value of the pedaling force. As a result, users may need to additionally purchase integrally formed strain gauge cranks or pedals, destroy or disassemble the original crank or pedal structure on the bicycle, and then install them onto the cranks or pedals on both sides thereby respectively acquiring the force information coming from the left foot and right foot, so it can be appreciated that the installation process is relatively tedious and such products may be quite expensive.

Accordingly, the present invention aims to design and provide a kind of product that can simultaneously meet the needs with respect to calculating the pedaling frequency and determining the force ratio of the left and right feet, thus addressing the issue that there are no available devices or products on the market capable of simultaneously fulfilling the requirements on calculating the pedaling frequency and determining the right and left feet force ratio. Consequently, the present invention ought to be an optimal solution.

SUMMARY OF THE INVENTION

A left and right feet pedaling analysis system is disclosed, comprising: a pedaling sensing device, which can be installed on the left foot crank or the right foot crank of a bicycle, and the pedaling sensing device includes: one or more accelerometers, used to detect acceleration change data when pedaling actions are taken, and the acceleration change data includes at least the acceleration waveform over a continuous duration of time; a pedaling time analysis unit, electrically connected to the accelerometer, in which the pedaling time analysis unit can analyze the acceleration change data to derive the time from a positive half cycle peak value to a negative half cycle peak value after a pedaling action as well as the time from a negative half cycle peak value to a positive half cycle peak value after a pedaling action, and then compare such two time data in order to form the ratio data of the left and right feet pedaling times; a pedaling force analysis unit, connected to the pedaling time analysis unit, in which the left and right feet pedaling time ratio data is opposite to the left and right feet pedaling force usage ratio data, so that the pedaling force analysis unit can analyze the left and right feet time ratio data in order to acquire the left and right feet pedaling force usage ratio data; a transmission unit, electrically connected to the accelerometer, the pedaling time analysis unit and the pedaling force analysis unit thereby transmitting the acceleration change data, the left and the right feet pedaling time ratio data and the left and right feet pedaling force usage ratio data; and an electronic carrier, capable of receiving the acceleration change data, the left and right feet pedaling time ratio data and the left and right feet pedaling force usage ratio data transmitted by the transmission unit.

More specifically, the pedaling sensing device further includes a rotation number analysis unit which is electrically connected to the transmission unit and the accelerometer and configured to analyze the detected acceleration change data in order to calculate a signal cycle generation number per second, and then acquire a pedaling rotation number based on the calculated signal cycle generation number per second.

More specifically, the pedaling sensing device further includes a first installation direction analysis unit which is electrically connected to the transmission unit and the accelerometer and configured to determine whether the pedaling sensing device is installed at an outer position or an inner position of the crank on the bicycle based on the order in which the signal peaks sensed by the accelerometer occur.

More specifically, the pedaling sensing device further includes a second installation direction analysis unit which is electrically connected to the transmission unit and the accelerometer and configured to determine whether the pedaling sensing device is installed at an upward position or a downward position of the crank on the bicycle based on the offset direction of the signals sensed by the accelerometer.

More specifically, the electronic carrier is a handheld smart device or a vehicle meter capable of receiving the data transmitted by the transmission unit and displaying on the electronic carrier in order to provide the pedaling information.

More specifically, the transmission unit of the pedaling sensing device can transmit the data detected by the pedaling sensing device via wired transmissions or wireless transmissions such that the electronic carrier can receive the acceleration change data, the left and right feet pedaling time ratio data as well as the left and right feet pedaling force usage ratio data sent out by the transmission unit.

More specifically, if the pedaling sensing device is installed on the left foot crank of the bicycle, then the time from the positive half cycle peak to the negative half cycle peak represents the left foot time or the right foot time and the time from the negative half cycle peak to the positive half cycle peak represents the right foot time or the left foot time, and subsequently the left foot time and the right foot time are compared in order to form the left and right feet pedaling time ratio data.

More specifically, if the pedaling sensing device is installed on the right foot crank of the bicycle, then the time from the positive half cycle peak to the negative half cycle peak represents the left foot time or the right foot time and the time from the negative half cycle peak to the positive half cycle peak represents the right foot time or the left foot time, and subsequently the left foot time and the right foot time are compared in order to form the left and right feet pedaling time ratio data.

A left and right feet pedaling analysis system is disclosed, comprising: a pedaling sensing device, which can be installed on the left foot crank or the right foot crank of a bicycle, and the pedaling sensing device includes: one or more accelerometers, used to detect acceleration change data when pedaling actions are taken, and the acceleration change data includes at least the acceleration waveform over a continuous duration of time; a transmission unit, electrically connected to the accelerometer so as to transmit the acceleration change data; an electronic carrier, capable of receiving the acceleration change data transmitted by the transmission unit, and internally including: a pedaling time analysis unit, used to, based on the received acceleration change data, derive the time from a positive half cycle peak value to a negative half cycle peak value after a pedaling action as well as the time from a negative half cycle peak value to a positive half cycle peak value after a pedaling action, and then compare such two time data in order to form the ratio data of the left and right feet pedaling times; and a pedaling force analysis unit, connected to the pedaling time analysis unit, in which the left and right feet pedaling time ratio data is opposite to the left and right feet pedaling force usage ratio data, so that the pedaling force analysis unit can analyze the left and right feet time ratio data in order to acquire the left and right feet pedaling force usage ratio data.

More specifically, the electronic carrier further includes a rotation number analysis unit which is configured to analyze the received acceleration change data in order to calculate a signal cycle generation number per second, and then acquire a pedaling rotation number based on the calculated signal cycle generation number per second.

More specifically, the electronic carrier further includes a first installation direction analysis unit which is configured to determine whether the pedaling sensing device is installed at an outer position or an inner position of the crank on the bicycle based on the order in which the received signal peaks occur.

More specifically, the electronic carrier further includes a second installation direction analysis unit which is configured to determine whether the pedaling sensing device is installed at an upward position or a downward position of the crank on the bicycle based on the offset direction of the received signals.

More specifically, the electronic carrier is a handheld smart device or a vehicle meter capable of displaying such analysis data on the electronic carrier in order to provide the pedaling information.

More specifically, the transmission unit of the pedaling sensing device can transmit the data detected by the pedaling sensing device via wired transmissions or wireless transmissions such that the electronic carrier can receive the data sent out by the transmission unit.

More specifically, if the pedaling sensing device is installed on the left foot crank of the bicycle, then the time from the positive half cycle peak to the negative half cycle peak represents the left foot time or the right foot time and the time from the negative half cycle peak to the positive half cycle peak represents the right foot time or the left foot time, and subsequently the left foot time and the right foot time are compared in order to form the left and right feet pedaling time ratio data.

More specifically, if the pedaling sensing device is installed on the right foot crank of the bicycle, then the time from the positive half cycle peak to the negative half cycle peak represents the left foot time or the right foot time and the time from the negative half cycle peak to the positive half cycle peak represents the right foot time or the left foot time, and subsequently the left foot time and the right foot time are compared in order to form the left and right feet pedaling time ratio data.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Other technical contents, aspects and effects in relation to the present invention can be clearly appreciated through the detailed descriptions concerning the preferred embodiments of the present invention in conjunction with the appended drawings.

Figure 1A:
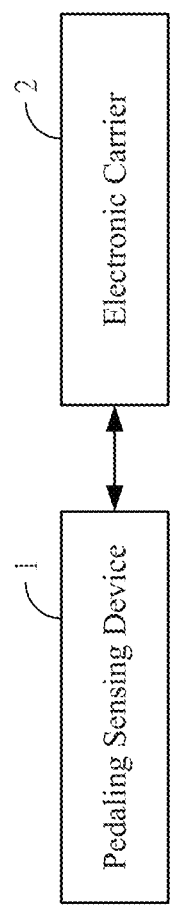
FIG. 1A shows an integral architecture view for a first embodiment of the left and right feet pedaling analysis system according to the present invention.
Figure 1B:
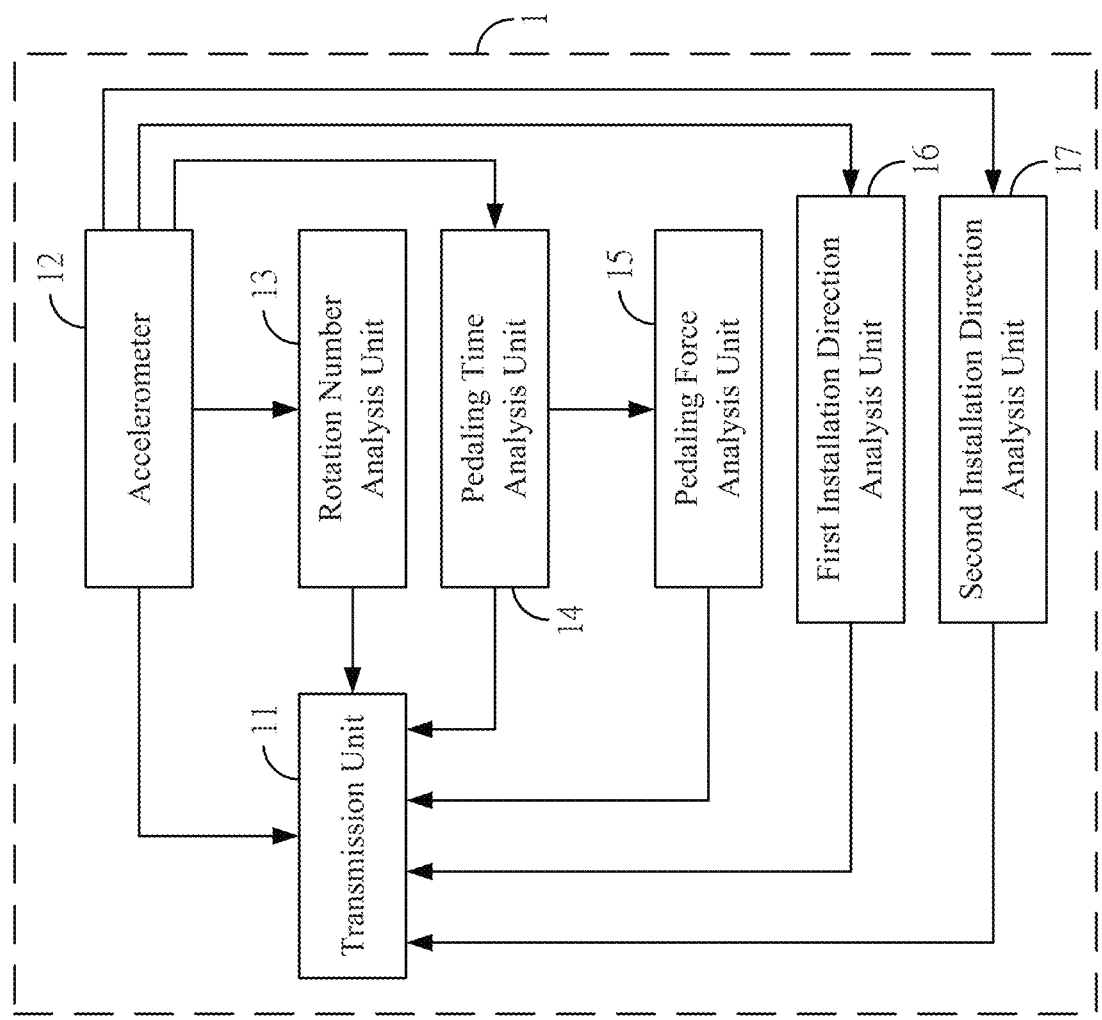
FIG. 1B shows an architecture view for the pedaling sensing device in the first embodiment of the left and right feet pedaling analysis system according to the present invention.
Figure 1C:
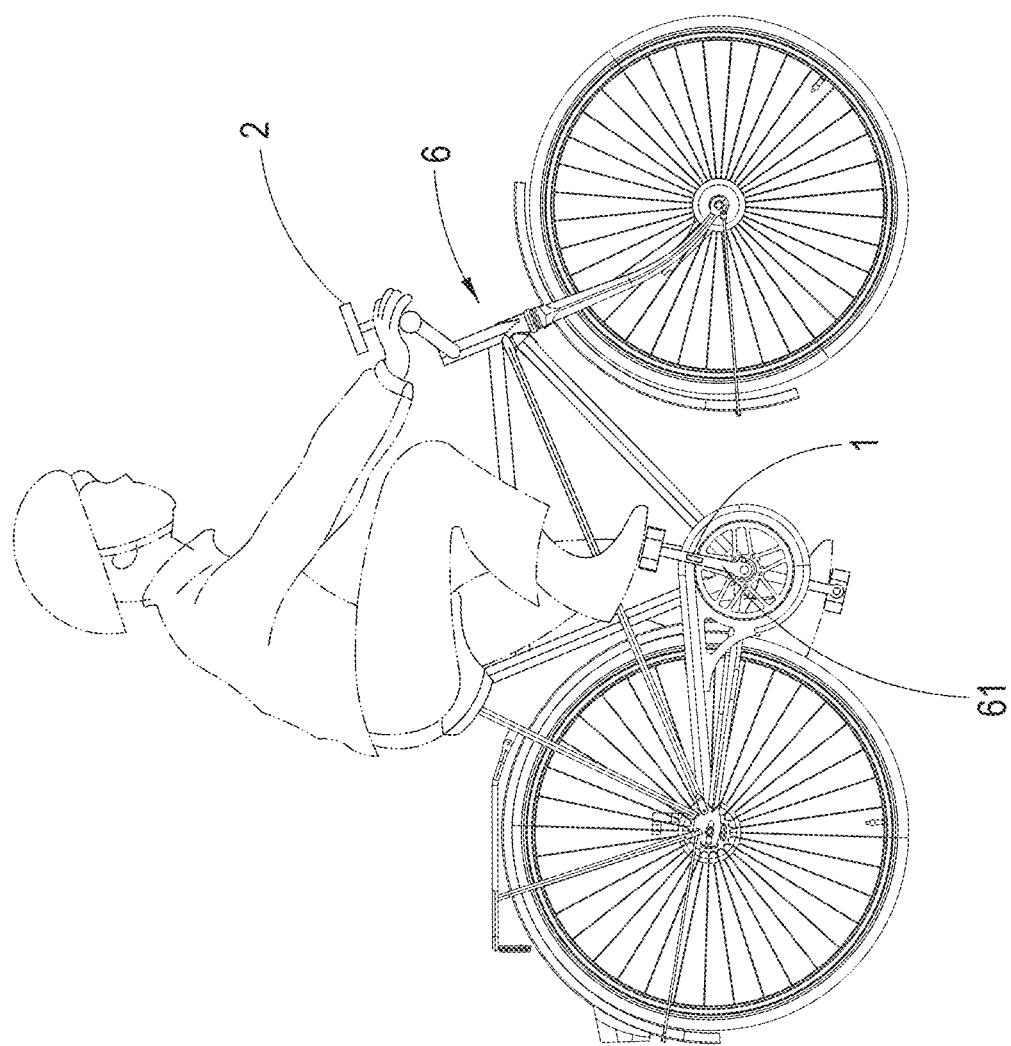
FIG. 1C shows an implementation view of the left and right feet pedaling analysis system according to the present invention in assemblage with a bicycle.

Refer first to FIGS. 1A-1C, wherein an integral architecture view for a first embodiment, an architecture view for the pedaling sensing device in the first embodiment, and an implementation view in assemblage with a bicycle, of the left and right feet pedaling analysis system according to the present invention are respectively shown. It can be seen from such Figures that the illustrated left and right feet pedaling analysis system comprises a pedaling sensing device 1 and an electronic carrier 2 capable of receiving data transmitted by the transmission unit 11.

The pedaling sensing device 1 is installed on the right foot crank 61 or the left foot crank of a bicycle 6 (not shown in the Figures, and the right foot crank 61 is exemplified in the present embodiment), and the pedaling sensing device 1 also includes a transmission unit 11, one or more accelerometers 12, a rotation number analysis unit 13, a pedaling time analysis unit 14, a pedaling force analysis unit 15, a first installation direction analysis unit 16 as well as a second Installation direction analysis unit 17.

Herein the transmission unit 11 is configured to transmit data, and the acceleration change data can be detected and measured during pedaling, which may at least include the acceleration waveforms for a certain continuous duration of time. Moreover, the transmission unit 11 can transmit the data detected by the pedaling sensing device 1 via wired transmissions or wireless transmissions such that the electronic carrier 2 can receive the data sent out by the transmission unit.

In addition, the accelerometer 12 may be a sensor instrument or device capable of measuring acceleration and/or gravity acceleration.

Herein the rotation number analysis unit 13 can be configured to analyze the received acceleration change data in order to calculate a signal cycle generation number per second, and then acquire a pedaling rotation number based on the calculated signal cycle generation number per second.

Besides, the pedaling time analysis unit 14 can be applied to, based on the received acceleration change data, derive the time from a positive half cycle peak value to a negative half cycle peak value after a pedaling action as well as the time from a negative half cycle peak value to a positive half cycle peak value after a pedaling action, and then compare such two time data in order to form the ratio data of the left and right feet pedaling times.

It should be appreciated that, since the left and right feet pedaling time ratio data is opposite to the left and right feet pedaling force usage ratio data, the pedaling force analysis unit 15 can analyze the left and right feet time ratio data in order to acquire the left and right feet pedaling force usage ratio data.

Meanwhile, the first installation direction analysis unit 16 is configured to determine whether the pedaling sensing device 1 is installed at an outer position or an inner position of the crank on the bicycle based on the order in which the signal peaks detected by the accelerometer 12 occur.

Also, the second installation direction analysis unit 17 is configured to determine whether the pedaling sensing device 1 is installed at an upward position or at a downward position of the crank on the bicycle based on the signal offset direction detected by the accelerometer 12.

The electronic carrier 2 may be a handheld smart device or a vehicle meter. Taking the vehicle meter as an example, it can directly receive the data transmitted by the transmission unit 11 and display it on a displayer unit after receiving. Or, alternatively, in case the electronic carrier 2 is a handheld smart device, a proprietary application program (APP) can be installed on the electronic carrier 2 such that the received data can be shown by the APP installed in the electronic carrier 2 thereby providing the pedaling information.

Figure 2A:
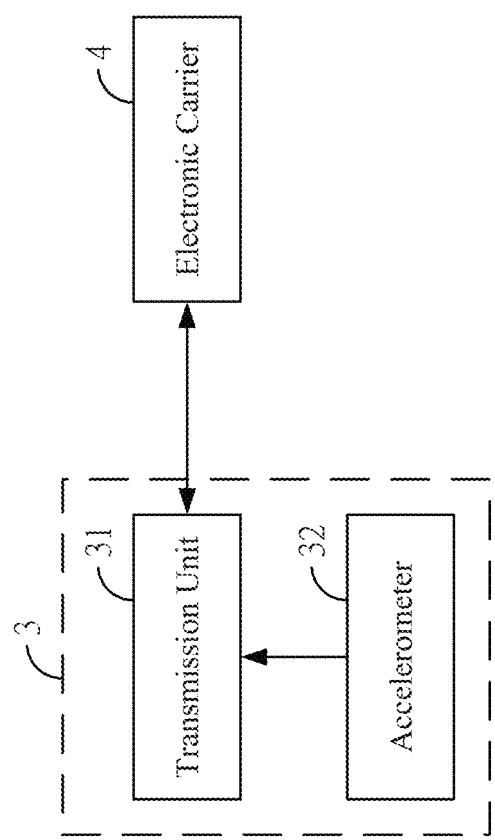
FIG. 2A shows an integral architecture view for a second embodiment of the left and right feet pedaling analysis system according to the present invention.
Figure 2B:
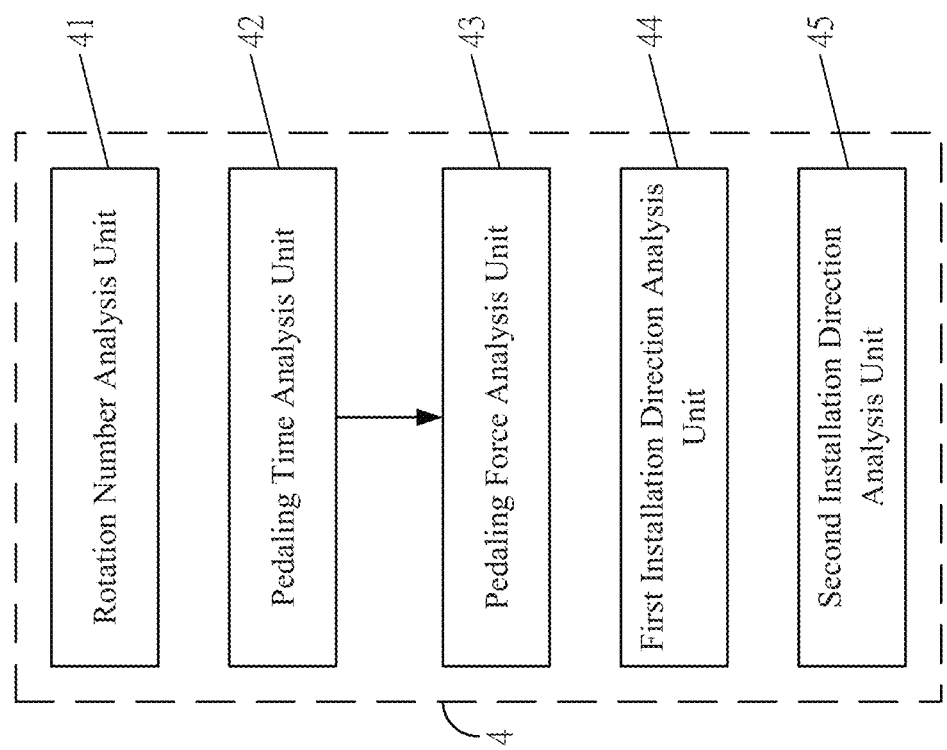
FIG. 2B shows an architecture view for an electronic carrier in the second embodiment of the left and right feet pedaling analysis system according to the present invention.

Furthermore, in addition to the aforementioned configuration, it is also possible to implement the embodiment of the present invention as shown in FIGS. 2A-2B, wherein the illustrated left and right feet pedaling analysis system according to the present invention comprises a pedaling sensing device 3 and an electronic vehicle 4 capable of receiving the data transmitted by the transmission unit, and wherein the pedaling sensing device 3 includes at least a transmission unit 31 and one or more accelerometers 32.

It can be seen that the electronic vehicle 4 in the present embodiment includes a rotation number analysis unit 41, a pedaling time analysis unit 42, a pedaling force analysis unit 43, a first installation direction analysis unit 44 and a second installation direction analysis unit 45. Therefore, in the second embodiment, the acceleration change data detected by the accelerometer 32 can be analyzed and transmitted to the electronic carrier 4 such that the electronic carrier 4 can analyze the number of pedaling rotations, the left and right feet pedaling time ratio data, the left and right feet pedaling force usage ratio data, and the installation direction of the pedaling sensing device (the electronic carrier 4 may further internally include a receiving unit, thereby allowing the received data to be analyzed by an internally installed or built-in analysis unit).

Figure 3:
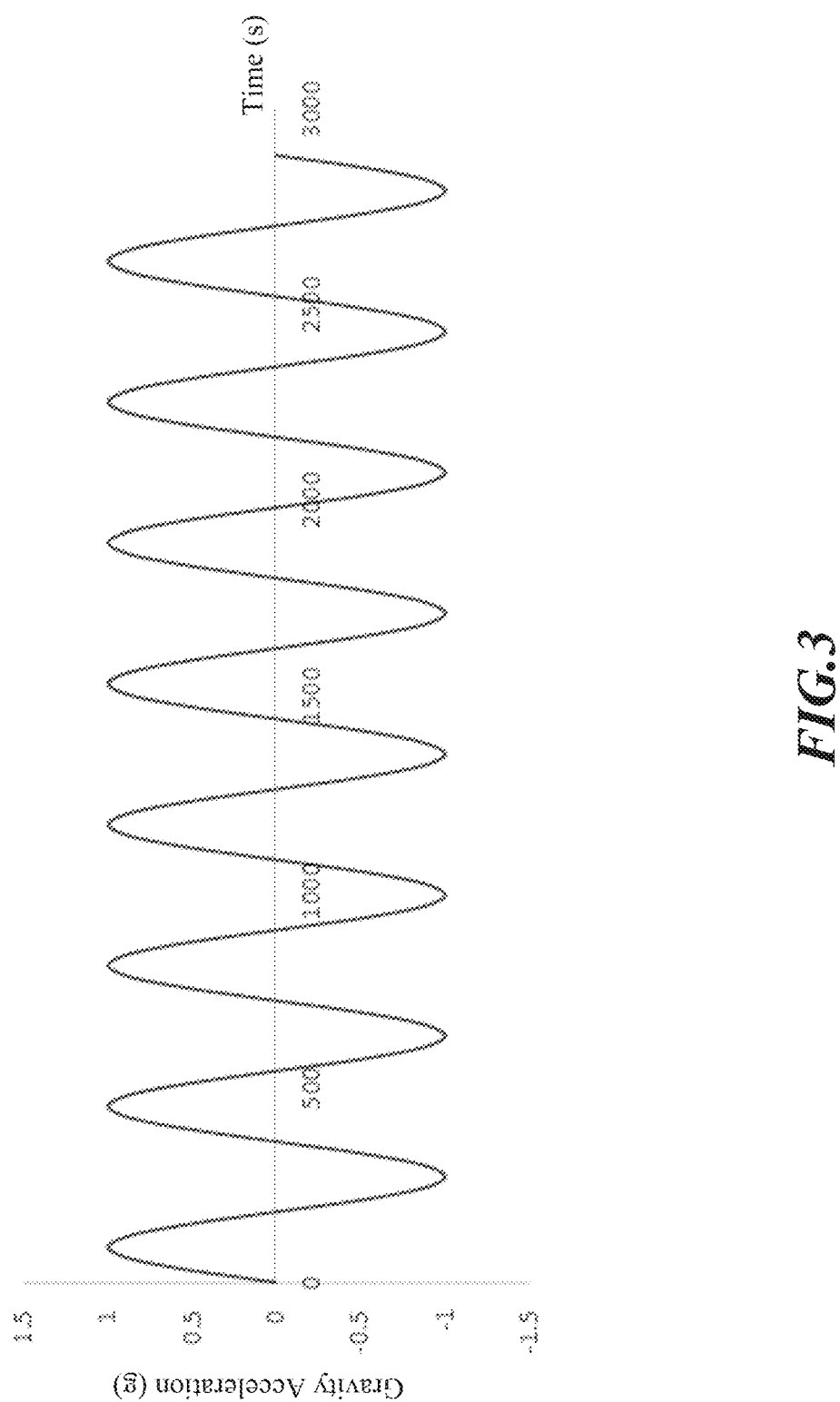
FIG. 3 shows an accelerometer signal diagram of the left and right feet pedaling analysis system according to the present invention.

The signals detected by the gravity accelerometer is shown in FIG. 3, wherein the present invention performs the sensing operations with a gravitational accelerometer capable of measuring gravitational acceleration, the determination is based on the number of cycles per second in the gravitational accelerometer signals, and since one cycle per second is equal to 60 RPM, if it is 1.5 cycles per second, then the number of pedaling rotations can be judged to be 90 RPM.

Figure 4:
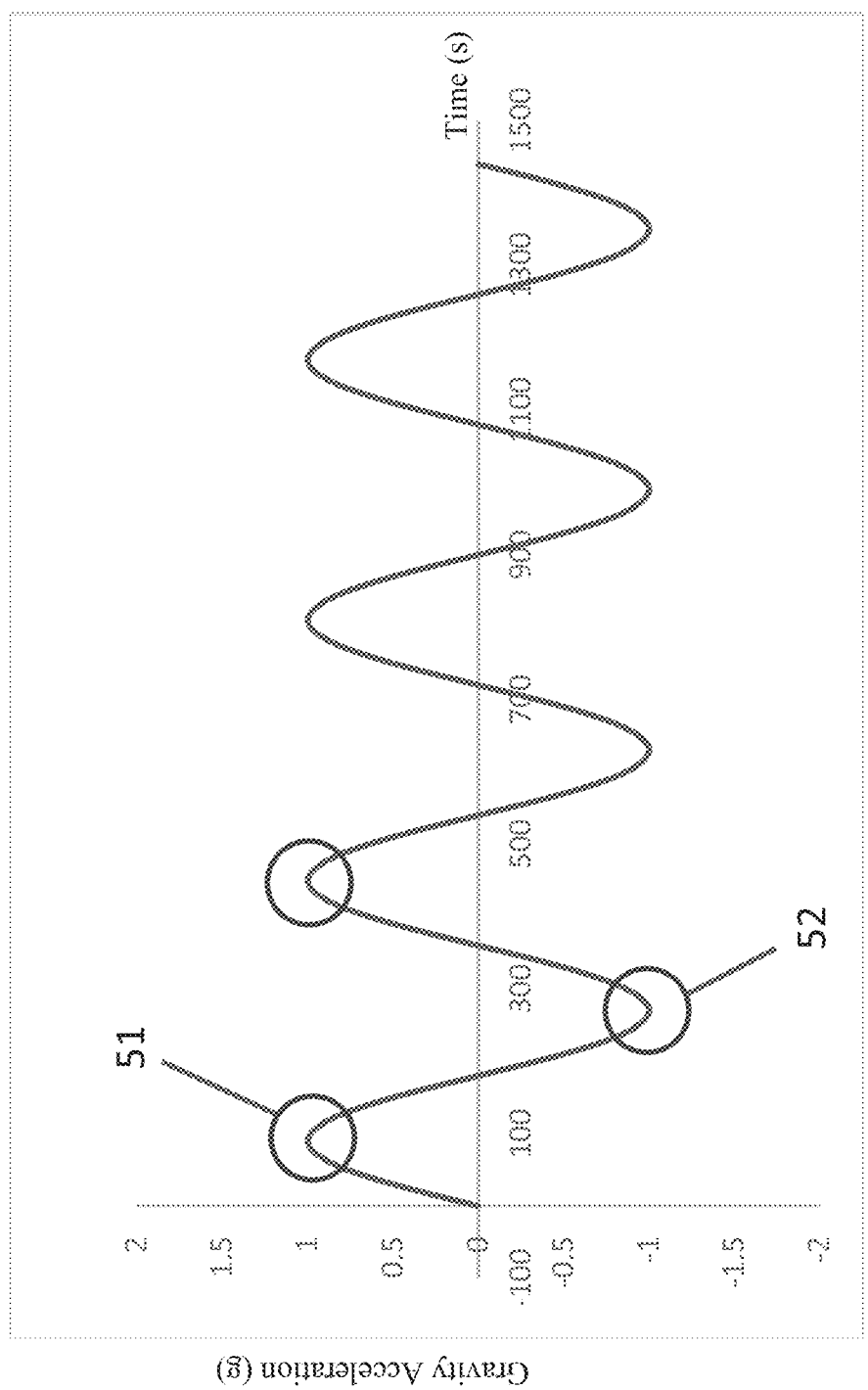
FIG. 4 shows a waveform analysis diagram of the left and right feet pedaling analysis system according to the present invention.

When the pedaling sensing device 1 is mounted on the left foot crank of the bicycle, in case of pedaling on the left foot, as shown in FIG. 4, within a complete pedaling cycle, the ratio between the duration of time from the top dead point 51 to the bottom dead point 52 (i.e., the signal travels from a positive peak value to a negative peak value) and the duration of time from the bottom dead point 52 to the top dead point 51 (i.e., the pedaling force is applied by the right foot) will be calculated and determined. Then, in case such a "left foot:right foot" time ratio is calculated to be 44:56, since the left-right feed pedaling time is opposite or reverse to the pedaling force, that is, the "left foot: right foot" force usage ratio can be determined to be 56:44, in which the shorter the pedaling time the left foot or the right foot completes, the greater the force usage from that foot is in comparison with the other foot. This principle can be utilized to distinguish the ratio of the left and right feet force usages.

Based on the relationship between the tangential force and the rotation of a circular motion, the above-mentioned relationship between time and force can be explained as below; that is, the greater the applied force is, the faster the tangential acceleration becomes, thus generating a faster angular velocity. Hence, the time required for going through the same distance becomes shorter as well. It can be clearly seen that the paths of the left and right feet are the same, so the greater the pedaling force is applied, the shorter the time required for completing the pedaling action becomes, thus that the left and right feet pedaling time is generally opposite to the pedaling force. As such, according to this principle, the force usage ratio of the left and right feet can be derived and analyzed.

Or alternately, suppose the pedaling sensing device 1 is installed on the right foot crank of the bicycle, then the time from the positive half cycle peak to the negative half cycle peak represents the right foot time and the time from the negative half cycle peak to the positive half cycle peak represents the left foot time, and then the left foot time and the right foot time are compared in order to form the left and right feet pedaling time ratio data, and subsequently converting the left and right feet pedaling time ratio data in order to figure out the left and right feet pedaling force usage ratio data.

Figure 5A:
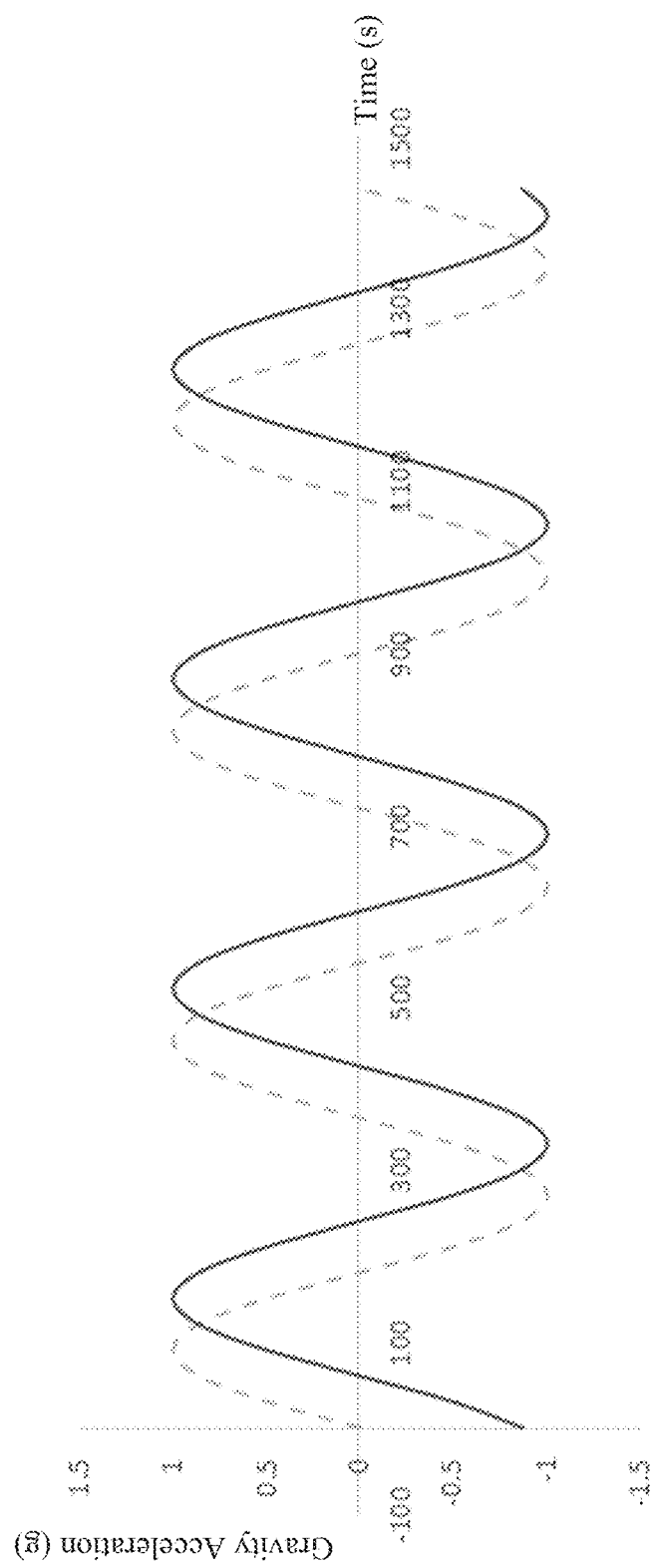
FIG. 5A shows an installation direction waveform diagram of the left and right feet pedaling analysis system according to the present invention.
Figure 5B:
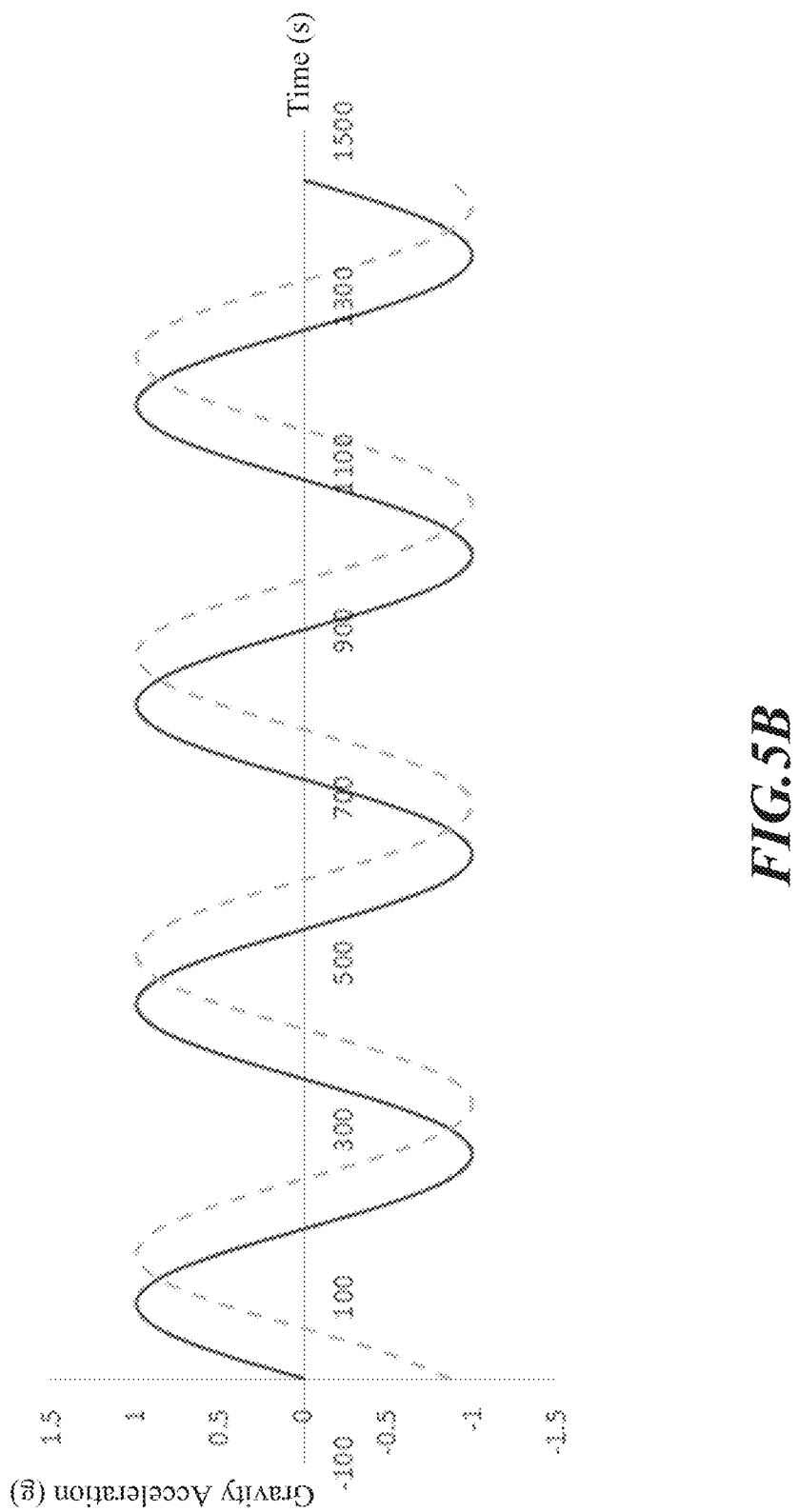
FIG. 5B shows an installation direction waveform diagram of the left and right feet pedaling analysis system according to the present invention.
Figure 5C:
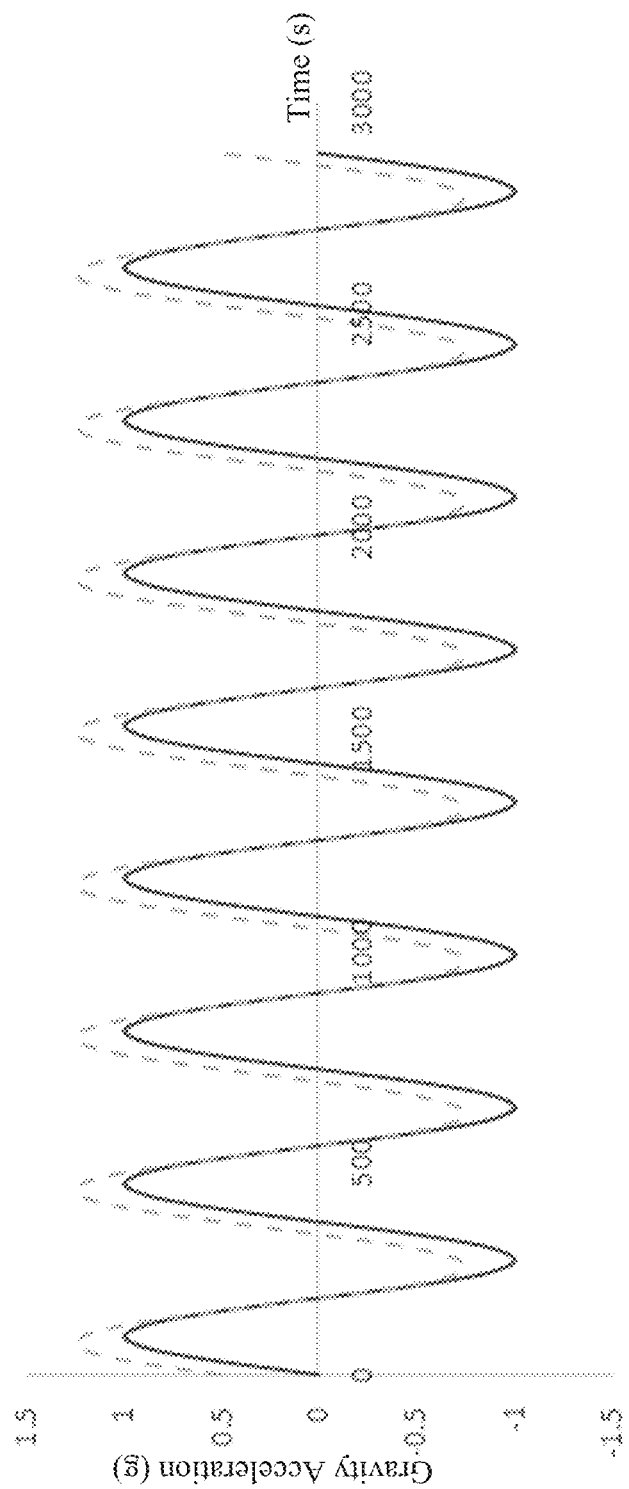
FIG. 5C shows an installation direction waveform diagram of the left and right feet pedaling analysis system according to the present invention.
Figure 5D:
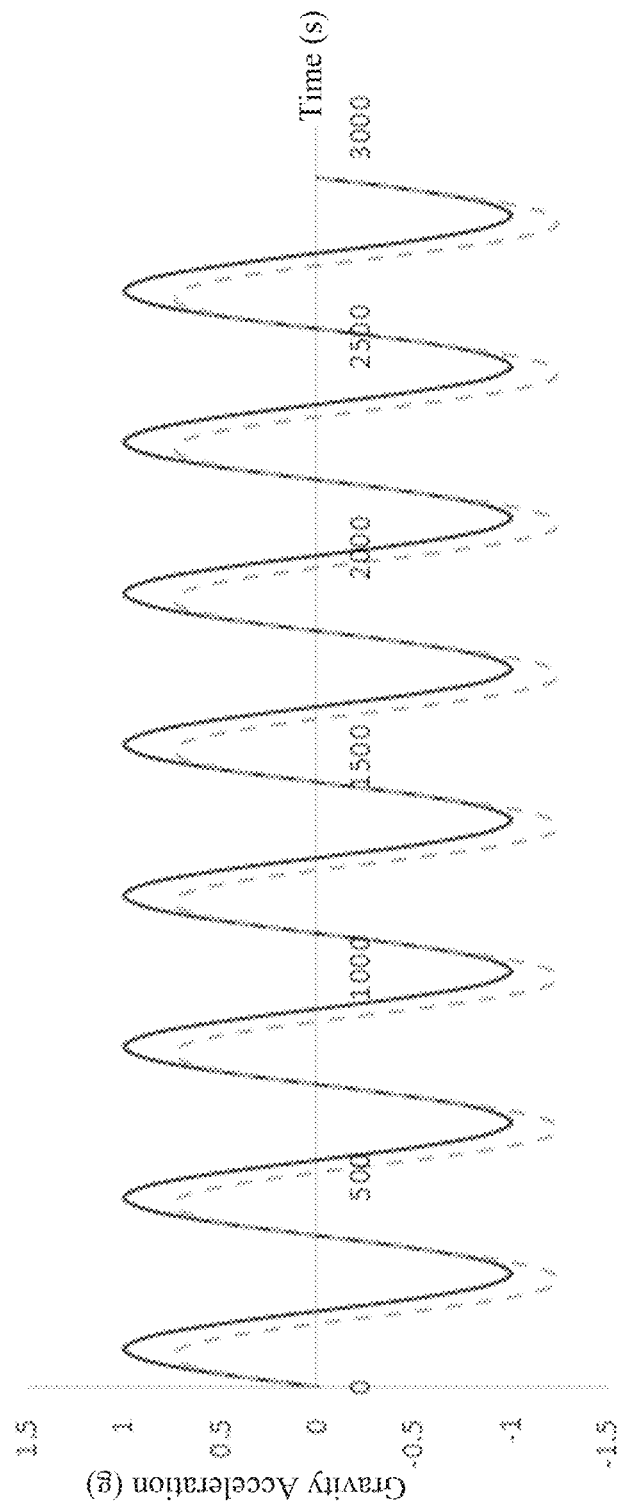
FIG. 5D shows an installation direction waveform diagram of the left and right feet pedaling analysis system according to the present invention.

In determining the product installation direction, it is possible to first instruct the user to install the product on the left foot crank, and then use the order in which the signal peaks appear to determine whether the installation is at an outside position or an inside position, and also apply the detected offset direction to determine whether the product is facing upwards or downwards; hereunder different situations are respectively listed and analyzed (wherein the dotted signal line indicates the normal acceleration signal and the solid signal line is the tangential acceleration signal):

(1) as shown in FIG. 5A, if the installation is located at the outside, then the dotted line signal occurs ahead of the solid line;

(2) as shown in FIG. 5B, if the installation is located at the inside, then the solid line signal occurs ahead of the dotted line;

(3) as shown in FIG. 5C, if the installation is facing towards the upside, the dotted line signal will shift upwards;

(4) as shown in FIG. 5D, if the installation is facing towards the downside, the dotted line signal will shift downwards.

In comparison with other conventional technologies, the left and right feet pedaling analysis system according to the present invention provides the following advantages:

(1) The present invention allows to install an accelerometer-based product on the left foot crank, calculate and acquire the pedaling rotation number and the left and right feet force usage ratio by determining the signals of the accelerometer during riding a bicycle, and automatically determine the installation direction of the present product by the user thereby judging the aforementioned functions.

(2) The present invention can be fixedly attached to the crank by means of straps, so it is possible to quickly install and accurately calculate the ratio of the left and right feet pedaling forces without disassembling or destroying the existing crank and pedal structure, suitable and applicable for various types of users.

It should be noticed that, although the present invention has been disclosed through the detailed descriptions of the aforementioned embodiments, such illustrations are by no means used to restrict the present invention; that is, skilled ones in relevant fields of the present invention can certainly devise any applicable alternations and modifications after having comprehended the aforementioned technical characteristics and embodiments of the present invention without departing from the spirit and scope thereof.

What is claimed is:

1. A left and right feet pedaling analysis system, comprising:
   a pedaling sensing device, which can be installed on the left foot crank or the right foot crank of a bicycle, and the pedaling sensing device includes:
      one or more accelerometer, used to detect acceleration change data when pedaling actions are taken, and the acceleration change data includes at least an acceleration waveform over a continuous duration of time;
      a pedaling time analysis unit, electrically connected to the accelerometer, in which the pedaling time analysis unit can analyze the acceleration change data to derive a first time from a positive half cycle peak value to a negative half cycle peak value after a pedaling action as well as a second time from a negative half cycle peak value to a positive half cycle peak value after a pedaling action, and then compare the first and the second time data in order to form a left and right feet pedaling time ratio data;
      a pedaling force analysis unit, connected to the pedaling time analysis unit, in which the left and right feet pedaling time ratio data is opposite to a left and right feet pedaling force usage ratio data, so that the pedaling force analysis unit can analyze the left and right feet pedaling time ratio data in order to acquire the left and right feet pedaling force usage ratio data;
      a transmission unit, electrically connected to the accelerometer, the pedaling time analysis unit and the pedaling force analysis unit thereby transmitting the acceleration change data, the left and the right feet pedaling time ratio data and the left and right feet pedaling force usage ratio data; and an electronic carrier, capable of receiving the acceleration change data, the left and right feet pedaling time ratio data and the left and right feet pedaling force usage ratio data transmitted by the transmission unit;

wherein if the pedaling sensing device is installed on the left foot crank of the bicycle, then a time from the positive half cycle peak value to the negative half cycle peak value represents a left foot time and a time from the negative half cycle peak value to the positive half cycle peak value represents the right foot time, and subsequently the left foot time and the right foot time are compared in order to form the left and right feet pedaling time ratio data;

wherein if the pedaling sensing device is installed on the right foot crank of the bicycle, then a time from the positive half cycle peak value to the negative half cycle peak value represents the right foot time and a time from the negative half cycle peak value to the positive half cycle peak value represents the left foot time, and subsequently the left foot time and the right foot time are compared in order to form the left and right feet pedaling time ratio data;

wherein the pedaling sensing device further includes a first installation direction analysis unit which is electrically connected to the transmission unit and the accelerometer and configured to determine whether the pedaling sensing device is installed at an outer position or an inner position of the left foot or the right foot crank on the bicycle; wherein if a normal acceleration signal sensed by the accelerometer occurs ahead of a tangential acceleration signal, the pedaling sensing device is installed at the outer position; wherein if a tangential acceleration signal occurs ahead of a normal acceleration signal, the pedaling sensing device is installed at the inner position; and wherein the pedaling sensing device further includes a second installation direction analysis unit which is electrically connected to the transmission unit and the accelerometer and configured to determine whether the pedaling sensing device is installed at an upward position or a downward position of the left foot or the right foot crank on the bicycle; wherein if the normal acceleration signal sensed by the accelerometer shifts upwards of the tangential acceleration signal, the pedaling sensing device is installed at the upward position; wherein if the normal acceleration signal shifts downwards of the tangential acceleration signal, the pedaling sensing device is installed at the downward position.

2. The left and right feet pedaling analysis system according to claim 1, wherein the pedaling sensing device further includes a rotation number analysis unit which is electrically connected to the transmission unit and the accelerometer and configured to analyze the detected acceleration change data in order to calculate a signal cycle generation number per second, and then acquire a pedaling rotation number based on the calculated signal cycle generation number per second.

3. The left and right feet pedaling analysis system according claim 1, wherein the electronic carrier is a handheld smart device or a vehicle meter capable of receiving the acceleration change data, the left and the right feet pedaling time ratio data and the left and right feet pedaling force usage ratio data transmitted by the transmission unit and displaying on the electronic carrier in order to provide a pedaling information.

4. The left and right feet pedaling analysis system according claim 1, wherein the transmission unit of the pedaling sensing device can transmit the acceleration change data, the left and the right feet pedaling time ratio data and the left and right feet pedaling force usage ratio data detected by the pedaling sensing device via wired transmissions or wireless transmissions such that the electronic carrier can receive the acceleration change data, the left and the right feet pedaling time ratio data and the left and right feet pedaling force usage ratio data sent out by the transmission unit.

* * * * *